(12) United States Patent
Feng et al.

(10) Patent No.: US 7,810,214 B2
(45) Date of Patent: Oct. 12, 2010

(54) AUTOMATICALLY OPENING HINGE ASSEMBLY FOR PORTABLE ELECTRONIC DEVICES

(75) Inventors: An-Ming Feng, Shenzhen (CN); Rui-Hao Chen, Shenzhen (CN); Zhong-Shu Qin, Shenzhen (CN); Ye Liu, Shenzhen (CN); Chih-Wei Su, Taipei Hsien (TW); Hsiao-Hua Tu, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 450 days.

(21) Appl. No.: 11/946,336

(22) Filed: Nov. 28, 2007

(65) Prior Publication Data
US 2009/0007380 A1      Jan. 8, 2009

(30) Foreign Application Priority Data
Jul. 4, 2007      (CN) .................. 2007 1 0076373

(51) Int. Cl.
*E05D 11/10* (2006.01)

(52) U.S. Cl. .................. 16/348; 16/305; 16/330; 379/433.13; 455/575.3

(58) Field of Classification Search ................ 16/348, 16/305, 307, 277, 297, 321, 303, 330; 379/433.13; 455/575.3; 361/679.27; 403/116
See application file for complete search history.

(56) References Cited

U.S. PATENT DOCUMENTS

| 1,200,538 | A  | * | 10/1916 | Smith et al. | .................. 16/303 |
| 4,788,746 | A  | * | 12/1988 | Idler | .......................... 16/297 |
| 6,647,593 | B2 | * | 11/2003 | Iguchi et al. | .................. 16/386 |
| 6,678,539 | B1 | * | 1/2004 | Lu | ........................ 455/575.1 |
| 7,213,301 | B2 | * | 5/2007 | Sakai et al. | .................... 16/303 |
| 7,334,297 | B2 | * | 2/2008 | Ma et al. | ........................ 16/348 |
| 2006/0112516 | A1 | * | 6/2006 | Chen et al. | .................... 16/330 |

* cited by examiner

*Primary Examiner*—William L. Miller
(74) *Attorney, Agent, or Firm*—Jeffrey T. Knapp

(57) ABSTRACT

A hinge assembly (200) includes a housing (12), a shaft (11), a fixing pin (14), a transposition mechanism (13) and a first spring (16). The housing has a circumferential wall defining a manual slot (121) and an automatic slot (123). Each of the manual slot and the automatic slot runs through a circumferential wall thereof. The shaft defines a pin hole (1141), and the shaft is engaged in the housing. The fixing pin passes through the pin hole of the shaft. One end of the fixing pin is alternatively received in the manual slot or the automatic slot. The transposition mechanism is configured for switching the pin from the manual slot to the automatic slot. The first spring provides an elastic force causing the housing to move relative to the shaft when the pin breaks away from the manual slot.

20 Claims, 21 Drawing Sheets

US 7,810,214 B2

AUTOMATICALLY OPENING HINGE ASSEMBLY FOR PORTABLE ELECTRONIC DEVICES

BACKGROUND OF THE INVENTION

1. Field of the Invention

The present invention relates to hinge assemblies and, particularly, to an automatically opening hinge assembly for foldable devices such as mobile phone, personal digital assistant (PDA) and so on.

2. Discussion of the Related Art

At present, perhaps the most popular portable electronic device in the marketplace is the foldable cellular telephone, which generally includes a cover section and a body section. The cover section and the body section are rotatably interconnected with a hinge, for switching the telephone between an open position and a closed position.

One kind of hinge assembly is described in China Publication Number 200410052435.7 published on Jun. 7, 2006. Referring to FIGS. 20 and 21, the hinge assembly 60 includes a shaft 61, two pins 62, a compression spring 63 and a housing 64. The shaft 61 has a fixing portion 612 formed at one end thereof. The housing 64 is a hollow cylinder with an open end. The housing 64 has an engaging portion 642 formed at one end thereof opposite to the open end. The housing 64 defines two spaced sliding slots 644 along a peripheral wall thereof. Each sliding slot 644 has a convex point 6442. In assembly, the compression spring 63 and the shaft 61 are received in the housing 64. One end of each pin 62 is fixed in the shaft 61, the other end of each pin 62 is received in a corresponding sliding slot 644. The pins 62 may slide along the sliding slots 644. The engaging portion 642 of the housing 64 is engaged with one of a cover and a body of a portable electronic device, and the fixing portion 612 of the shaft 61 is engaged with the other of a cover and a body of a portable electronic device.

When the cover is close relative to the body, the pins 62 are positioned at one end of the sliding slots 644 under the compression spring 63. When the cover needs to be opened relative to the body, the cover is opened by hand so as to bring the shaft 61 to rotate. Accordingly, the shaft 61 causes the pins 62 to slide along the sliding slots 644 until the pins 62 pass over the convex point 6442. Then, the cover is stopped to apply force, and the pins 62 automatically bring the shaft 61 to rotate about the housing 64 under the force of the compression spring 63, thus allowing the cover to rotate about the main body. However, a user must open the mobile phone using both hands to a predetermined degree so as to further automatically open the cover. This makes the mobile phone inconvenient to use in situations where the user has only one hand free.

Therefore, a new hinge mechanism is desired in order to overcome the above-described problems.

SUMMARY OF THE INVENTION

One embodiment of the present hinge assembly includes a housing, a shaft, a fixing pin, a transposition mechanism and a first spring. The housing has a circumferential wall defining a manual slot and an automatic slot. Each of the manual slot and the automatic slot runs through a circumferential wall thereof. The shaft defines a pin hole, and the shaft is engaged in the housing. The fixing pin passes through the pin hole of the shaft, and one end of the fixing pin is alternatively received in the manual slot or the automatic slot. The transposition mechanism is configured for switching the fixing pin from the manual slot to the automatic slot. The first spring provides an elastic force causing the housing to move relative to the shaft when the fixing pin breaks away from the manual slot.

Other advantages and novel features of the present hinge assembly will become more apparent from the following detailed description when taken in conjunction with the accompanying drawings.

BRIEF DESCRIPTION OF THE DRAWINGS

Many aspects of the hinge assembly can be better understood with reference to the following drawings. The components in the drawings are not necessarily to scale, the emphasis instead being placed upon clearly illustrating the principles of the present hinge assembly. Moreover, in the drawings, like reference numerals designate corresponding parts throughout the several views.

DETAILED DESCRIPTION OF THE EMBODIMENTS

Figure 1:
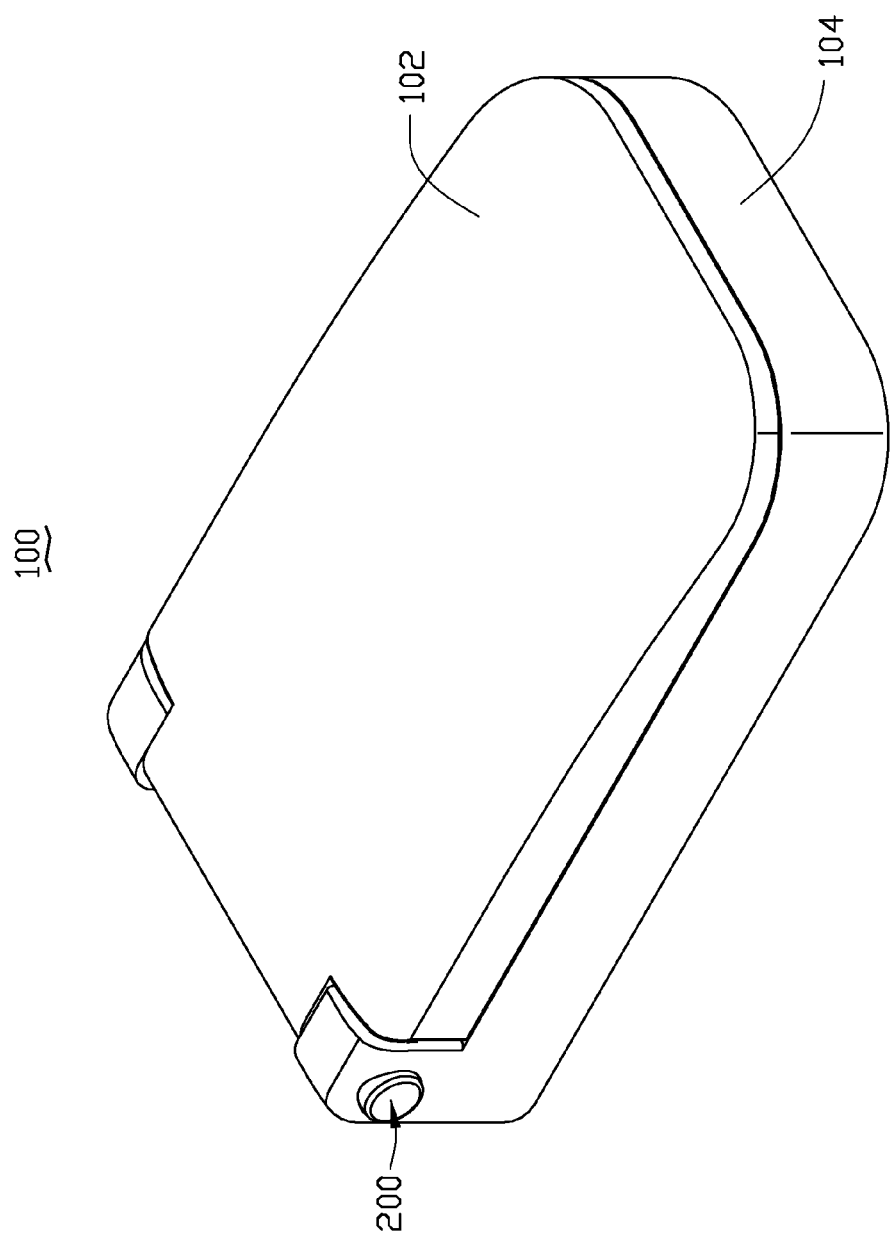
FIG. 1 is an isometric view of a first embodiment of the present hinge assembly, as used in a mobile phone.

Referring now to the drawings in detail, FIG. 1 shows a hinge assembly 200, applied to a foldable electronic device 100 such as a flip type mobile phone, for pivotably coupling a cover section 102 and a body section 104. It is to be understood, however, that the hinge assembly 200 could be advantageously used in other environments (e.g. cabinet doors). As such, although proving particularly advantageous when used in foldable electronic devices 100, the hinge assembly 200 should not be considered limited in scope solely to foldable electronic devices.

Figure 2:
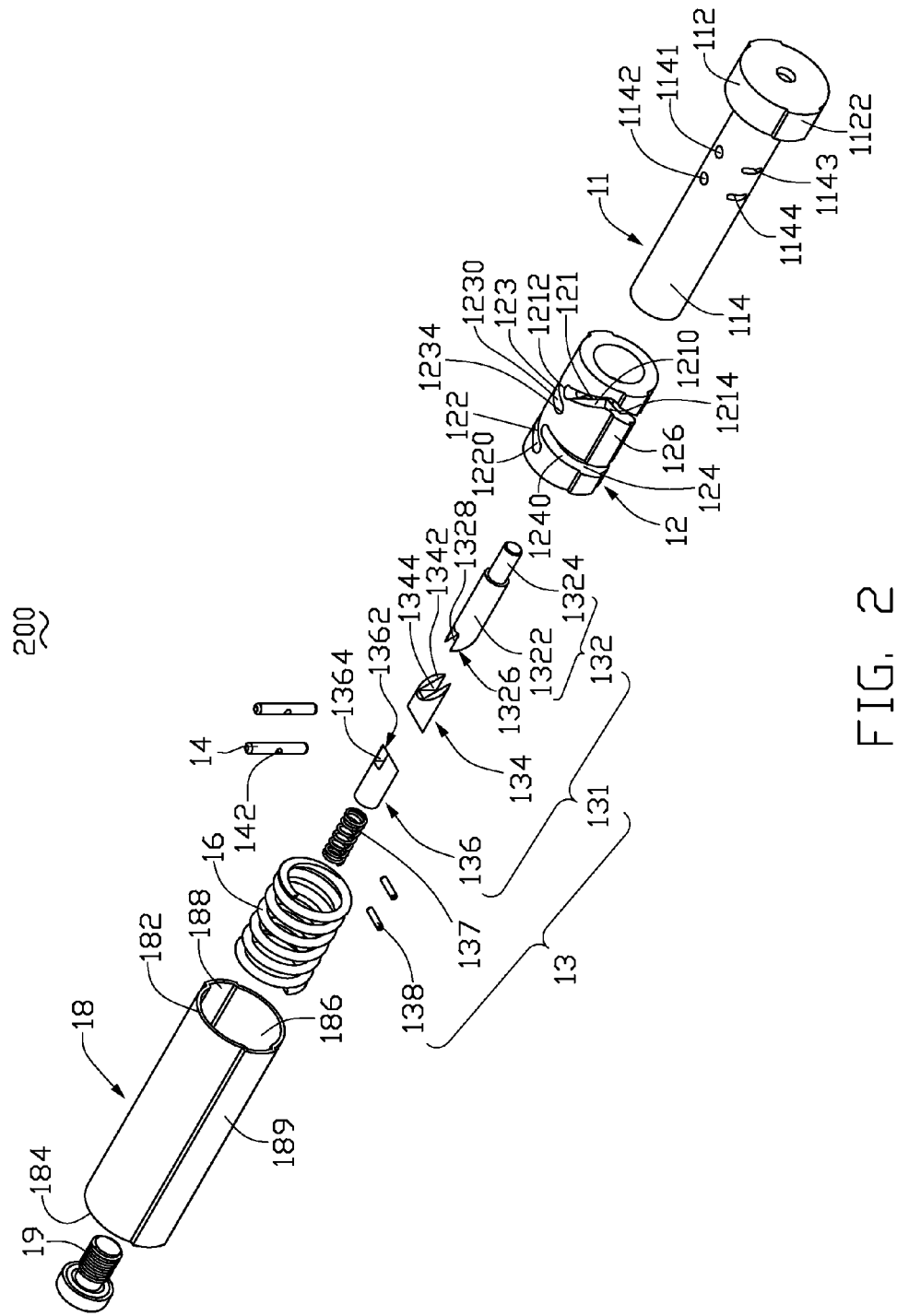
FIG. 2 is an exploded, isometric view of the first embodiment of the hinge assembly shown in FIG. 1.
Figure 3:
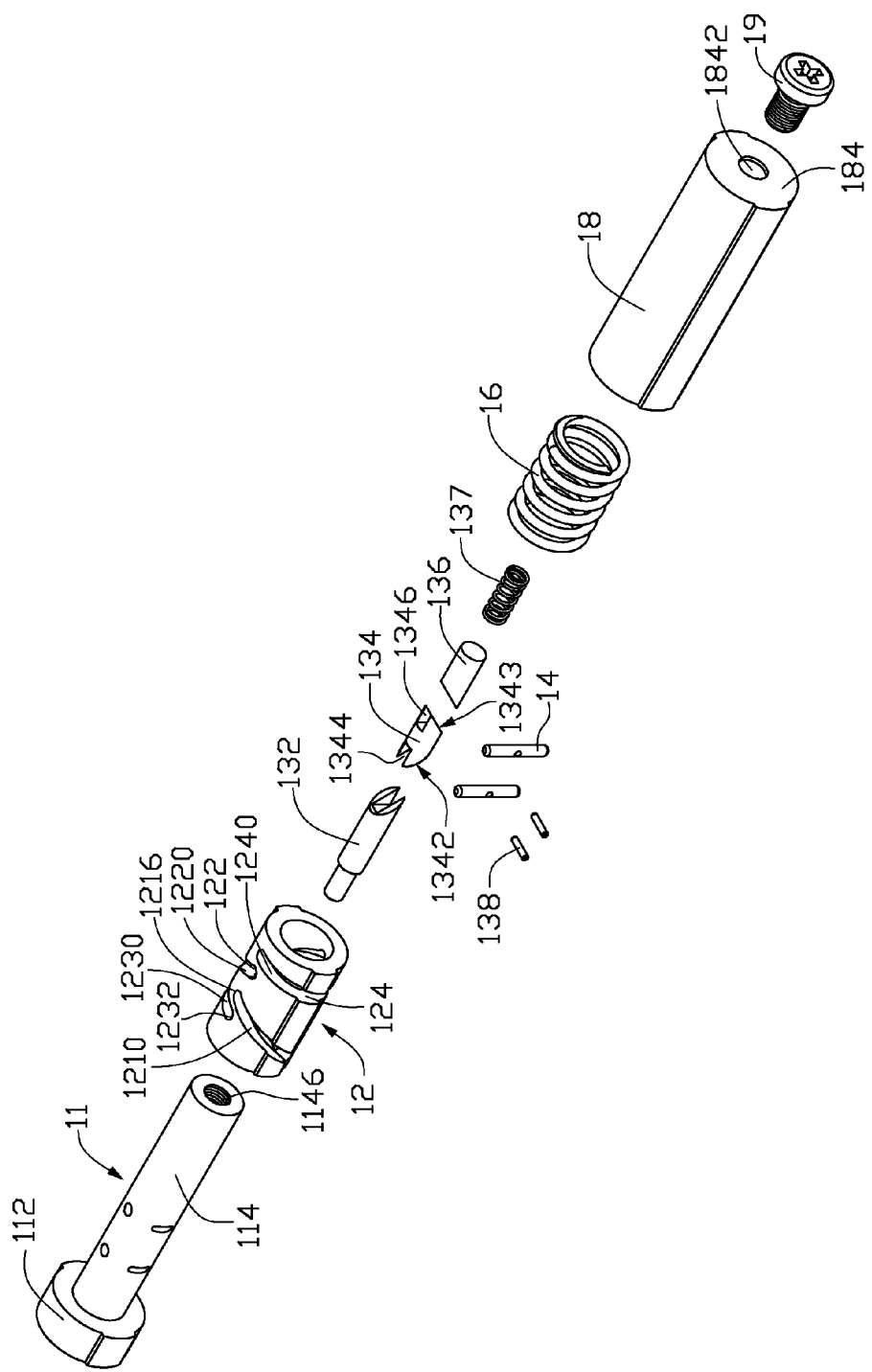
FIG. 3 is similar to FIG. 2, but viewed from another aspect.

Referring to FIGS. 2 and 3, the hinge assembly 200 in the embodiment illustrated includes a main shaft 11, a housing 12, a transposition mechanism 13, two fixing pins 14, a compression spring 16, a sleeve 18 and a screw 19.

Figure 4:
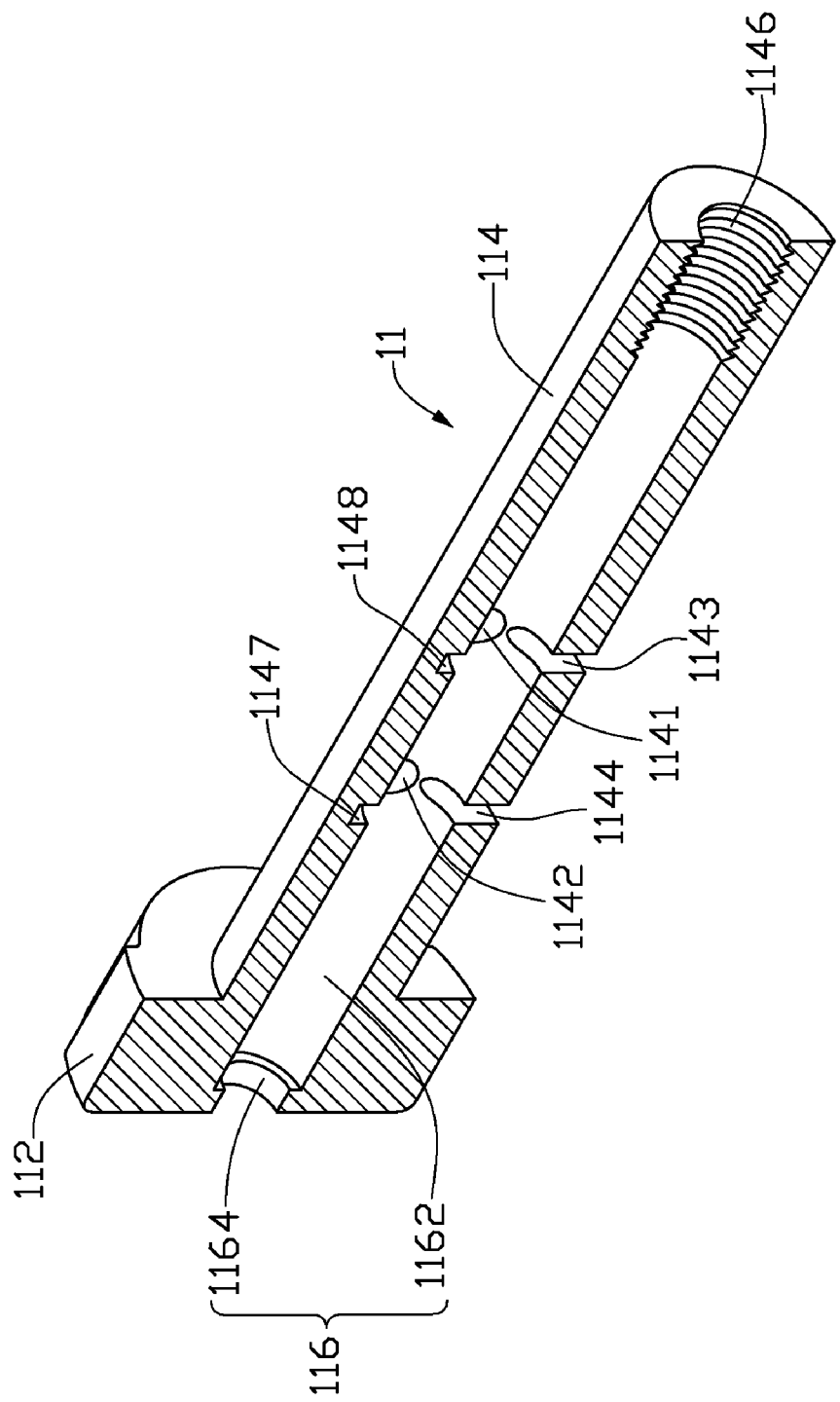
FIG. 4 is a three dimensional cut-away view of the shaft in FIG. 2.

Referring also to FIG. 4, the main shaft 11 includes a fixing portion 112 and a shaft portion 114. A diameter of the fixing portion 112 is larger than that of the shaft portion 114. The fixing portion 112 forms two symmetrical blocks 1122 at a peripheral wall thereof for engaging with a body section of a portable electronic device. The main shaft 11 defines a through passage 116 in a central area thereof along an axis thereof. The passage 116 includes a first passage 1162 and a second passage 1164. A diameter of the first passage 1162 is larger than that of the second passage 1164, thereby forming a step at a connection therebetween. An inner peripheral wall of one end of the first passage 1162, distant from the fixing portion 112, defines a thread 1146. The thread 1146 is configured for engaging with the screw 19.

The shaft portion 114 defines two pairs of pin holes 1141, 1142, two guiding slots 1143, 1144 and two receiving grooves 1147, 1148. Each axis of the pin holes 1141, 1142 is perpendicular to that of the main shaft 11. Each pair of pins holes 1141, 1142 is aligned with each other along an axis thereof. The pin holes 1141, 1142 are radially communicated with the passage 116 of the shaft portion 114, and each pair of the pin holes 1141, 1142 respectively receive a corresponding fixing pin 14. Each sliding slots 1143, 1144 is arcuate shaped, and are formed along a peripheral direction of the shaft portion 114. Each receiving groove 1147, 1148 is also arcuate shaped, and is opposite to a corresponding sliding slot 1143, 1144. Each sliding slot 1143, 1144, each receiving groove 1147, 1148 and each corresponding pin hole 1141, 1142 are respectively formed at two parallel conferential areas of the shaft portion 114.

Figure 5:
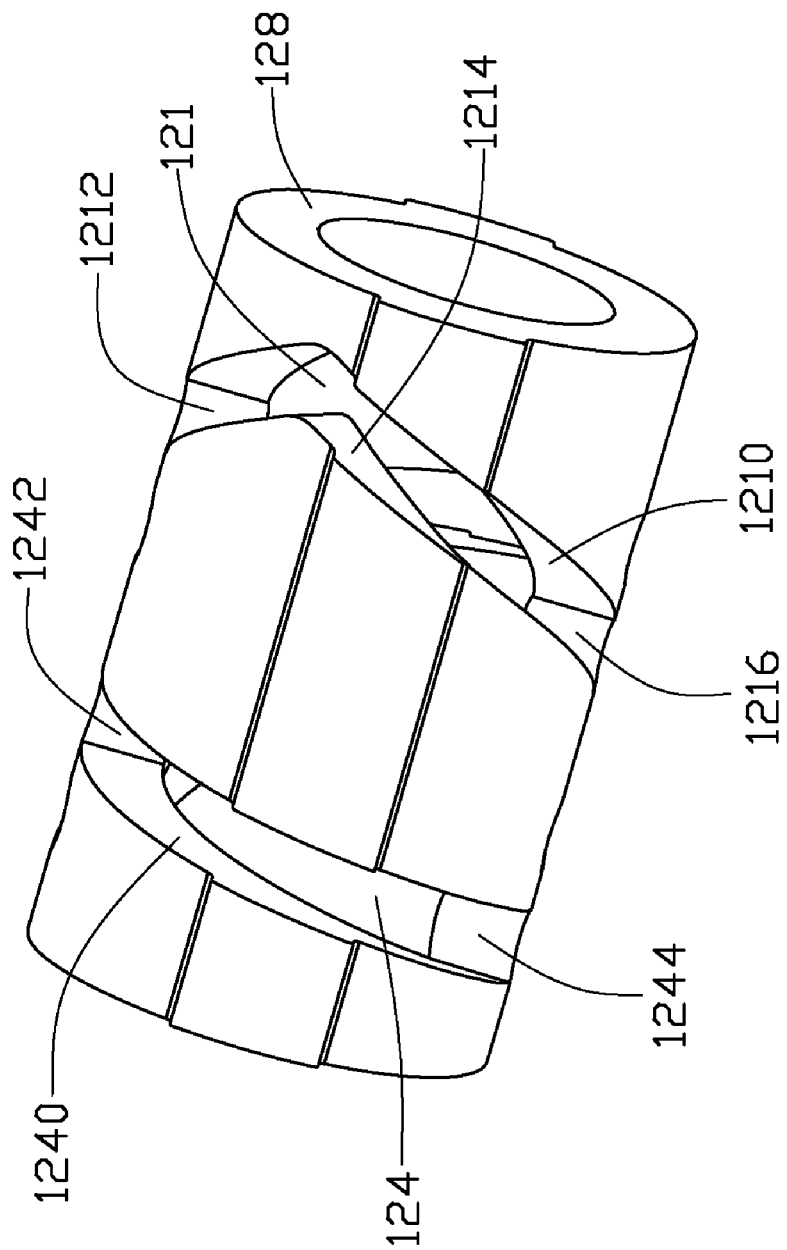
FIG. 5 is an enlarged view of the housing in FIG. 2.
Figure 6:
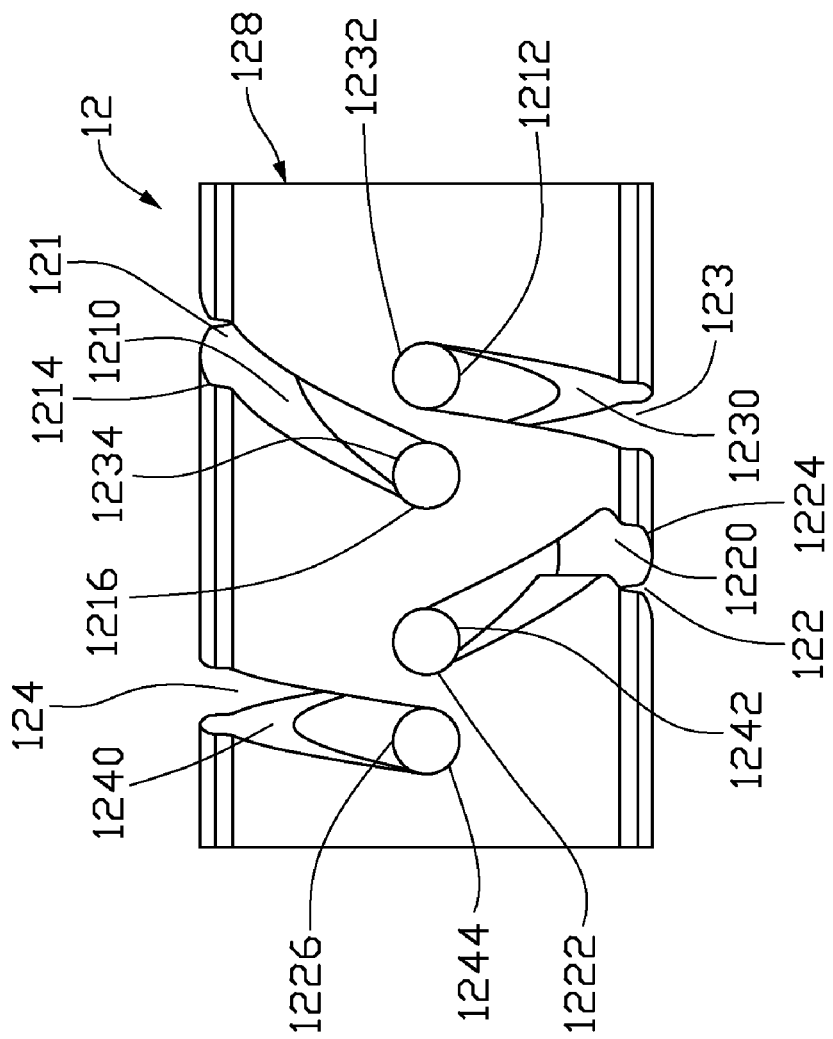
FIG. 6 is a top plan view of the housing in FIG. 2.

Referring to FIGS. 5 to 6, the housing 12 is substantially a hollow cylinder in shape. The housing 12 forms two symmetrical projections 126 at a peripheral wall thereof for engaging with the sleeve 18. The housing 12 defines a first manual slot 121, a first automatic slot 123, a second manual slot 122 and a second automatic slot 124.

The first manual slot 121 is defined by a first manual slot wall 1210. The first manual slot 121 includes a first end 1212 and a second end 1216. The first end 1212 and the second end 1216 are semicircular in shape. The first end 1212 and the second end 1216 are formed at opposite sides of the periphery wall of the housing 12. A first convex portion 1214 is formed between the first end 1212 and the second end 1216. The first automatic slot 123 is adjacent to the first manual slot 121. The first automatic slot 123 and the first manual slot 121 are respectively positioned at two sides of the housing 12. The first automatic slot 123 is defined by a first automatic slot wall 1230. The first automatic slot 123 includes a first end 1232 and a second end 1234. The first end 1232 and the second end 1234 are semicircular in shape. The first end 1232 is angled 180 degrees with the second end 1234. A center of the first end 1212 is aligned with that of the first end 1232, and a center of the second end 1216 is aligned with that of the second end 1234. Accordingly, the projection of the first end 1212 of the first manual slot 121 and the projection of the first end 1232 of the first automatic slot 123 may form a circle configured for receiving a corresponding fixing pin 14. The second end 1216 of the first manual slot 121 and the second end 1234 form a circle configured for receiving a corresponding fixing pin 14.

The structure of the second manual slot 122 and the second automatic slot 124 is similar to that of the first manual slot 121 and the first automatic slot 123. The second manual slot 122 is defined by a second manual slot wall 1220. The second manual slot 122 includes a first end 1222 and a second end 1226. The first end 1222 and the second end 1226 are semicircular in shape. The first end 1222 is angled 180 degrees with the second end 1226. A second convex portion 1224 is formed between the first end 1222 and the second end 1226. The second automatic slot 124 is adjacent to the second manual slot 122. The second automatic slot 124 and the second manual slot 122 are respectively positioned at two sides of the housing 12. The second automatic slot 124 includes a first end 1242 and a second end 1244. The first end 1242 and the second end 1244 are semicircular in shape. The first end 1242 is angled 180 degrees with the second end 1244. A center of the first end 1222 is aligned with that of the first end 1242, and a center of the second end 1226 is aligned with that of the second end 1244. Accordingly, the first end 1222 of the second manual slot 122 and the first end 1242 of the second automatic slot 124 form a circle configured for receiving a corresponding fixing pin 14. The second end 1226 of the second manual slot 122 and the second end 1244 of the second automatic slot 124 form a circle configured for receiving a corresponding fixing pin 14. The housing 12 includes a distal end 128. The first convex portion 1214 and the second convex portion 1224 protrude toward the distal end 128.

The transposition mechanism 13 includes a control module 131, a driven spring 137 and two guiding pins 138. The transposition mechanism 13 is configured for transferring/switching the fixing pins 14 from the manual slots 121, 122 to the automatic slots 123, 124. The control module 131 includes a push element 132, a follower element 134 and a return element 136.

The push element 132 is a stepped cylinder, and includes a first cylinder 1322 and a second cylinder 1324. The shape and size of the first cylinder 1322 is configured for engaging in the first passage 1162 of the main shaft 11. One end of the first cylinder 1322 located on the opposite side of the second cylinder 1324 has a wedge end 1326. The first wedge end 1326 defines a first groove 1328 for receiving a corresponding fixing pin 14. The shape and the size of the second cylinder 1324 is the same as that of the second passage 1164. A length of the second cylinder 1324 is larger than that of the second passage 1164 so as to allow the second cylinder 1324 to extend out from the second passage 1164.

The follower element 134 is a cylinder in shape. A diameter of the follower element 134 is similar to that of the first passage 1162 allowing the follower element 134 being received in the first passage 1162. One end of the follower element 134 defines a second wedge end 1342, the other end thereof defines a third wedge end 1343. The second and third wedge end 1342, 1343 incline toward a middle position of the follower element 134. The second wedge end 1342 defines a second groove 1344, and the third wedge end 1343 defines a third groove 1346. The second groove 1344 and the third groove 1346 are configured for receiving a corresponding fixing pin 14.

The return element 136 is substantially a cylinder in shape. The shape and size of the return element 136 is configured for engaging in the first passage 1162. One end of the return element 136 has a fourth wedge end 1362. The fourth wedge end 1362 defines a fourth groove 1364. The fourth groove 1364 is configured for receiving a corresponding fixing pins 14.

The driven spring 137 is a cylindrical helical spring (i.e., occupying a cylindrical volume). An outer diameter of the driven spring 137 is similar to that of the return element 136.

Each guiding pin 138 is substantially cylindrical in shape. The guiding pins 138 may be fixed with the fixing pins 14. One of the guiding pins 138 may be resisted between the first wedge end 1326 and the second wedge end 1342, the other of the guiding pins 138 may be resisted between the third wedge end 1343 and the third wedge end 1362.

Each fixing pin 14 is substantially cylindrical in shape. Each fixing pin 14 may be inserted in a corresponding pair of pin hole 1141, 1142. One end of each fixing pin 14 may be alternatively received in the manual slots 121, 122 or automatic slots 123, 124. Each fixing pin 14 defines a receiving hole 142 in a middle portion thereof. Each guiding pin 138 may be inserted into the receiving hole 142, and two ends of the guiding pin 138 may be received in the sliding slots 1143, 1144 and the receiving grooves 1147, 1148 of the main shaft 11.

The compression spring 16 a cylindrical helical spring (i.e., occupying a cylindrical volume). An outer diameter of the compression spring 16 is similar to that of the housing 12.

The sleeve 18 is a substantially hollow cylinder in shape, and includes an open end 182 and a half-closed end 184. The half-closed end 184 has a through hole 1842. Two long troughs 188 are defined in an inner wall of the sleeve 18. Accordingly, two sleeve blocks 189 are formed corresponding to the long troughs 188. The sleeve blocks 189 are used for engaging with the cover section 102 of the mobile phone 100. The projections 126 of the housing 12 are used for engaging in the long troughs 188 so that the housing 12 and the sleeve 18 do not rotate relative to each other.

Figure 7:
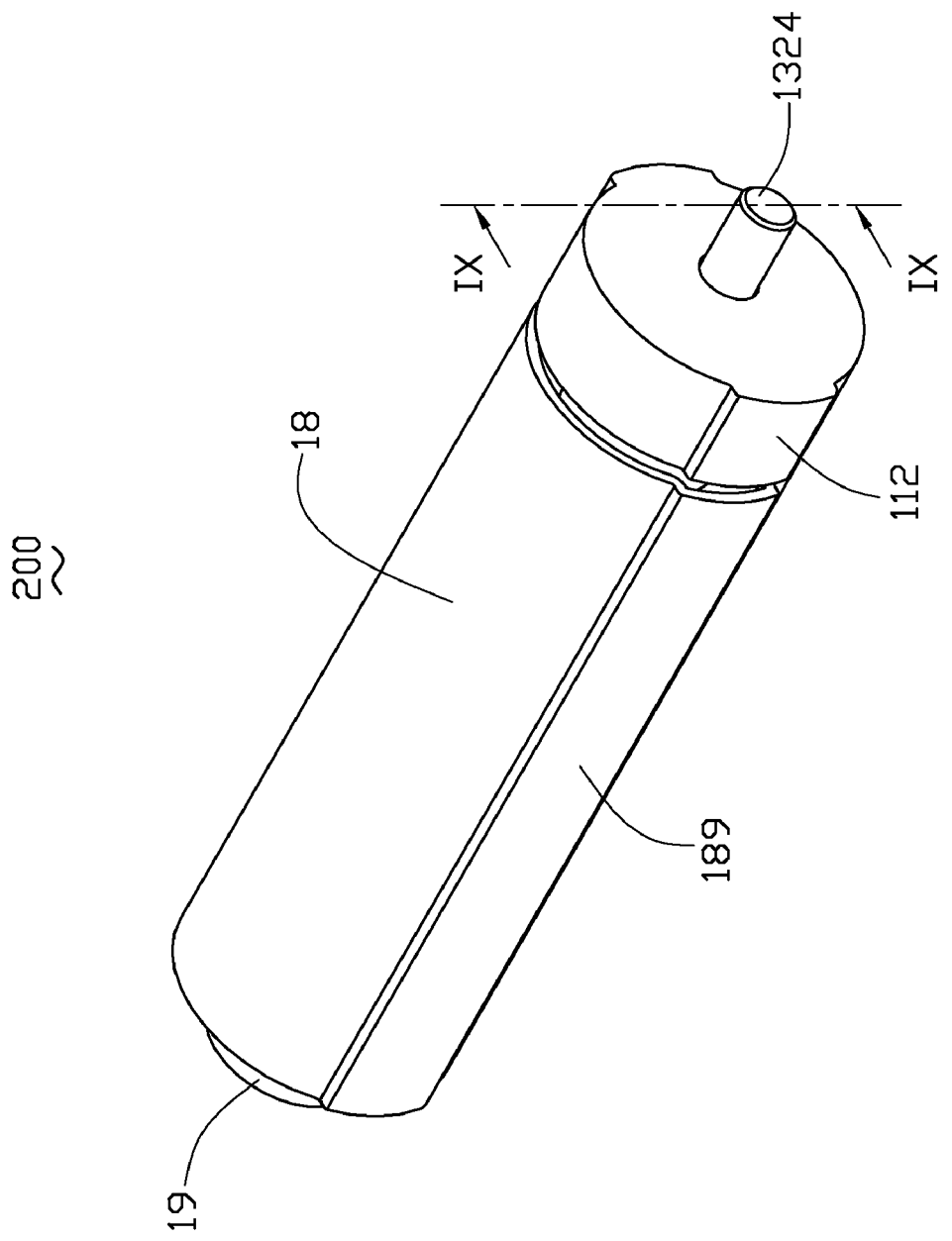
FIG. 7 is an assembled view showing the hinge assembly in FIG. 2.
Figure 8:
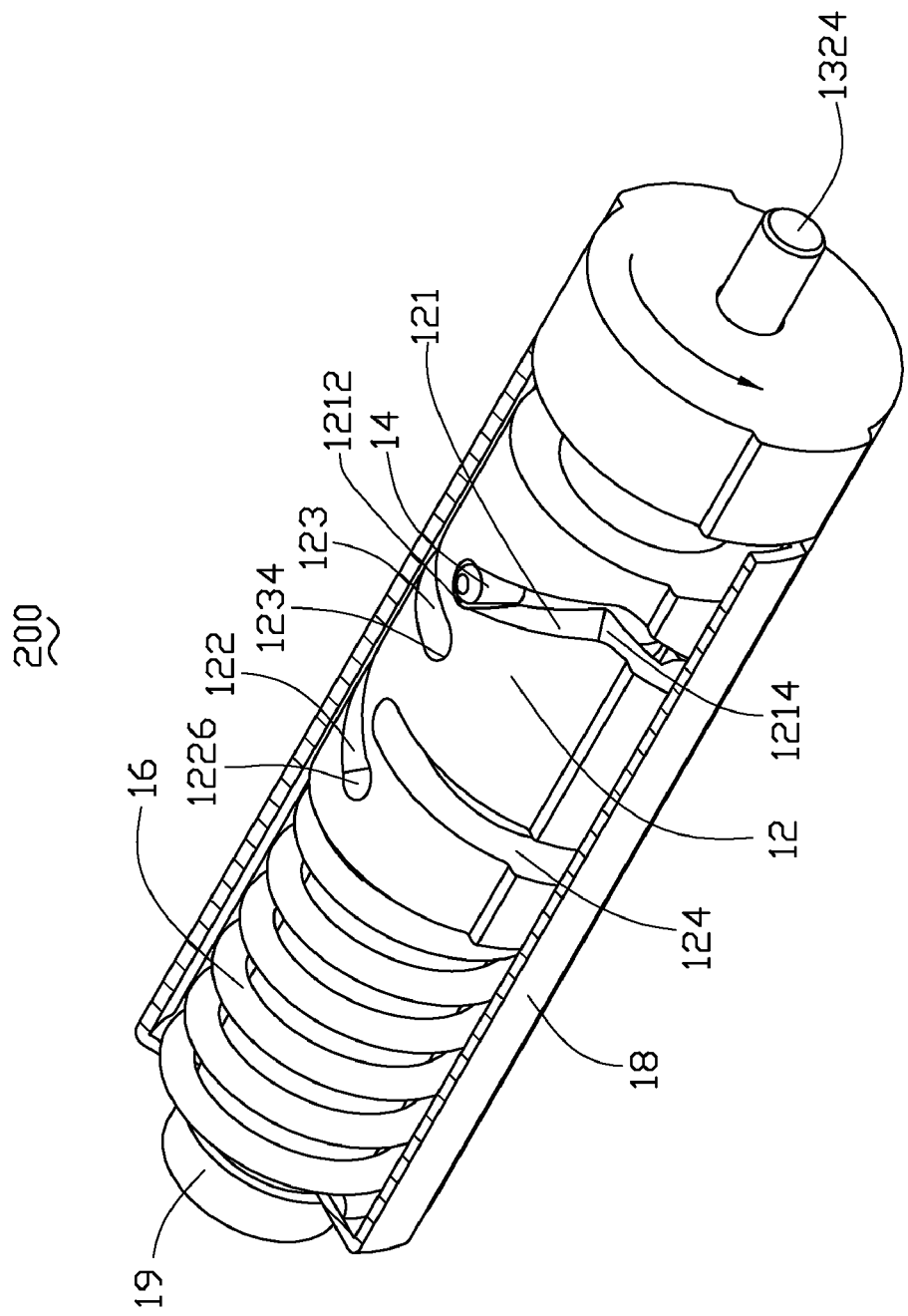
FIG. 8 is a partially cut-away view of the hinge assembly in FIG. 7.
Figure 9:
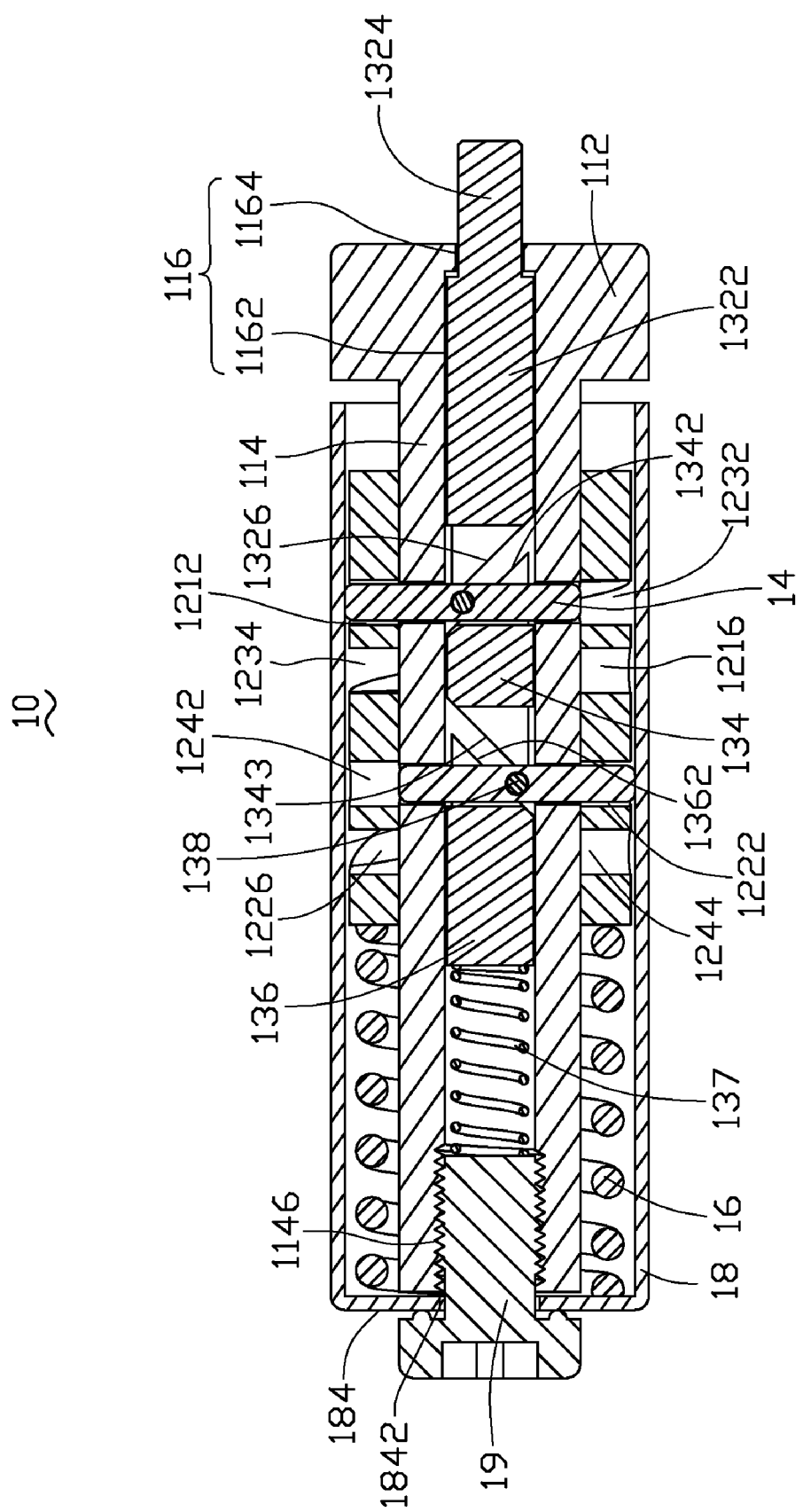
FIG. 9 is a cross-sectional view of FIG. 7 along IX-IX line.
Figure 10:
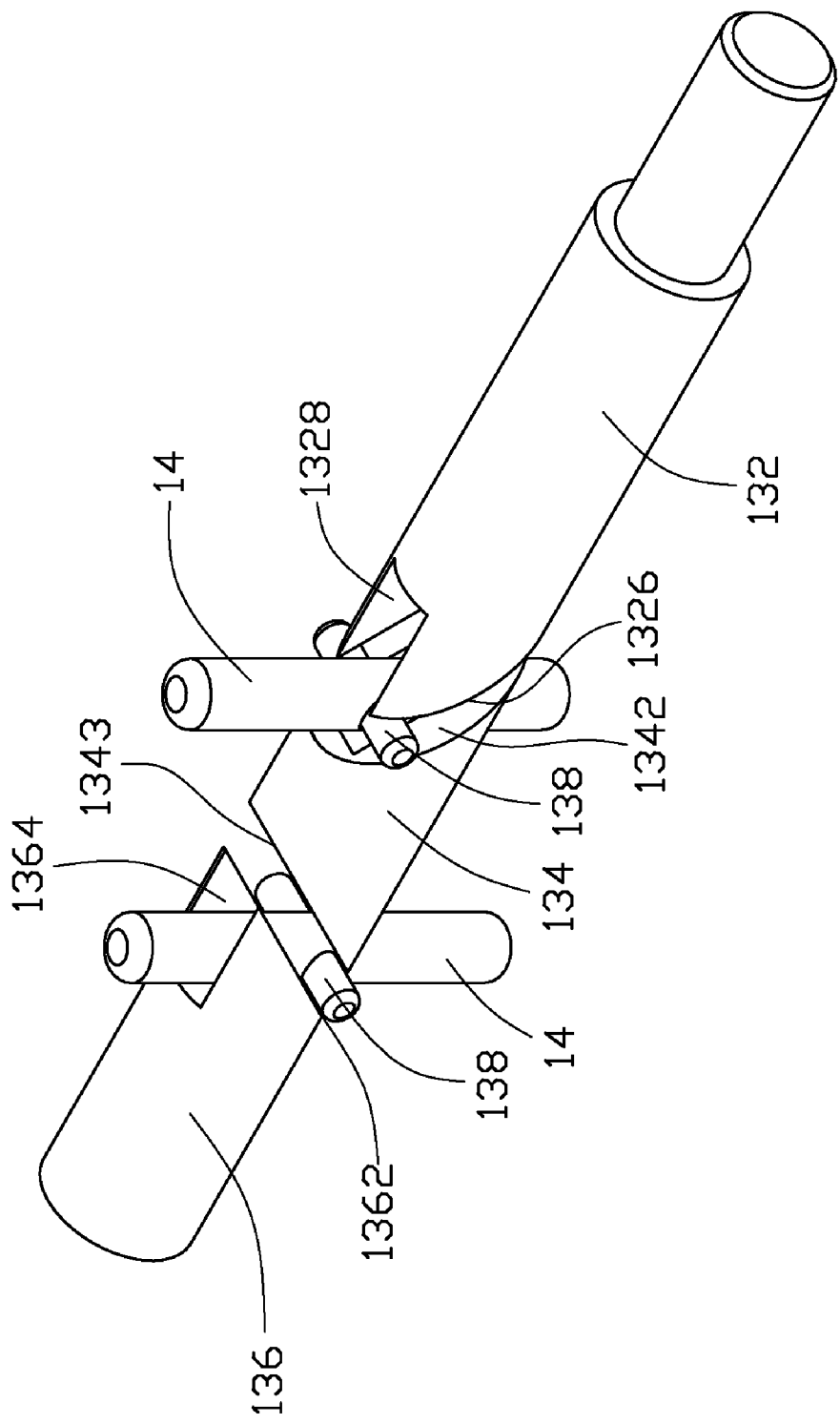
FIG. 10 is an assembled, schematic view of the guiding pins, the follower element, the return element, the push element and the fixing pins, showing the guiding pins respectively resisted between the return element and the follower element, between the follower element and the push element.

In assembly, referring to FIGS. 7 to 9, the push element 132 is received in the first passage 1162 of the main shaft 11, and the second cylinder 1324 extends through the second passage 1164. The housing 12 and the compression spring 16 are then placed around the shaft portion 114 of the main shaft 11. The push element 132, the main shaft 11 and the housing 12 are adjusted so that the first groove 1328 of the push element 132, the pin hole 1141 of the main shaft 11 and the first manual slot 121 of the housing 12 are aligned with each other. Next, one of the fixing pins 14 is perpendicularly inserted into the first manual slot 121, the pin hole 1141 and the first groove 1328. The fixing pin 14 is adjusted so that the receiving hole 142 may be aligned with the sliding slot 1143 of the main shaft 11 and the first manual slot 121 of the housing 12. Referring to FIG. 10, one of the guiding pins 138 is inserted into the sliding slot 1143 through the first manual slot 121, and is further inserted into the receiving hole 142 of one fixing pin 14. The guiding pin 138 extends out from the receiving hole 142, and is received in the receiving groove 1147. Preferably, the guiding pin 138 is tightly engaged in the receiving hole 142. The first wedge end 1326 resists the guiding pin 138.

The follower element 134 is received in the first passage 1162, and the fixing pin 14 is received in the second groove 1344 of the follower element 134. The second wedge end 1342 of the follower element 134 resists the guiding pin 137. Then, the other fixing pin 14 is inserted into the second manual slot 122, the second pin holes 1142, and the third groove 1346. The fixing pin 14 is adjusted so that the receiving hole 142 of the other fixing pin 14 is aligned with the second sliding slot 1144 and the second manual slot 122. Next, the other guiding pin 138 is inserted into the sliding slot 1144 through the second manual slot 122, and is further inserted into the receiving hole 142 of the fixing pin 14. The other guiding pin 138 extends out from the receiving hole 142, and is received in the receiving groove 1148. Preferably, the guiding pin 138 is tightly engaged in the receiving hole 142 of the fixing pin 14.

The return element 136 is received in the first passage 1162, and the fourth groove 1364 receives a corresponding fixing pin 14. The other guiding pin 138 is resisted between the third wedge end 1342 and the fourth wedge end 1362. The driven spring 137 is received in the first passage 1162, and one end of the driven spring 137 resists the return element 136. The sleeve 18 is placed around the compression spring 16 and the housing 12, with the projections 126 engaging in the long troughs 188. The screw 19 is inserted into the through hole 1842 of the sleeve 18, and is threaded into the threaded 1146 of the main shaft 11. Accordingly, the hinge assembly 200 is thus completely assembled.

Once the individual hinge component are assembled as described above, the hinge assembly 200 provides a self-contained component that can be sold as an off-the-shelf component or directly incorporated into a mobile phone or other device during manufacture. If incorporated into a mobile phone during manufacture, the sleeve blocks 189 of the sleeve 18 can engage in a cavity (not shown) of the cover section 102 of the mobile phone 100, and the blocks 1122 of the main shaft 11 connect with the body section 104 of the mobile phone 100. When the cover section 102 of the mobile phone 100 is in a fully closed position, one end of one fixing pin 14 resists the first end 1212 of the first manual slot 121, the other end of the fixing pin 14 is received in the pin holes 1141, and is coplanar with one side of the main shaft 11. That is, the fixing pin 14 is not received in the first automatic slot 123. The other fixing pin 14 resists the first end 1222 of the second manual slot 122, the other end of the fixing pin 14 is received in the pin holes 1142, and is coplanar with one side of the main shaft 11. The compression spring 16 has a predetermined pressure. The predetermined pressure of the compression spring 16 is exerted in the housing 12 so that the housing 12 has a rotation tendency relative to the main shaft 11. However, the housing 12 is prevented from rotating by the fixing pins 14.

In use, when a user wants to open the cover section 102 of the mobile phone 100 automatically, he/she may press the second cylinder 1324 of the push element 132. In this process, the push element 132 moves along an axial direction of the main shaft 11 toward the follower element 134. At the same time, the first wedge end 1326 pushes a corresponding guiding pin 138 to move. The guiding pin 138 only move up or down owing to the limitation of the sliding slot 1143. Under the role of the wedge role, the guiding pin 138 brings a corresponding fixing pin 14 to move toward the first automatic slot 123. At the same time, the guiding pin 138 resists the second wedge end 1342 of the follower element 134, thereby pushing the follower element 134 to move towards the return element 137. Accordingly, the third wedge end 1342 resists the other guiding pin 138 to move. Accordingly, the guiding pin 138 moves in the sliding slot 1144, and further brings the other fixing pin 14 to move toward the second automatic slot 124. The driven spring 137 is compressed by the return element 136 so as to accumulate elastic energy.

Figure 11:
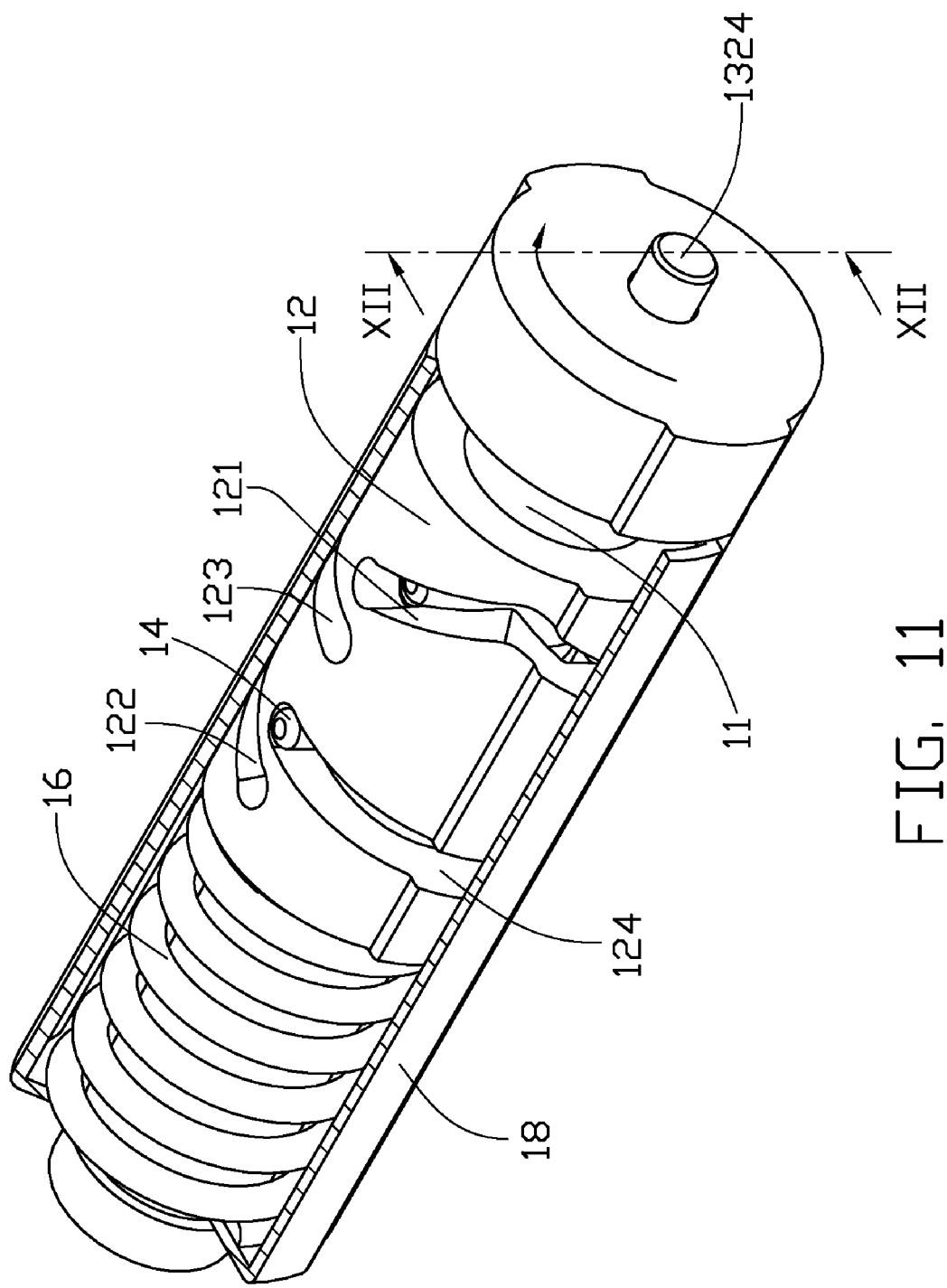
FIG. 11 is a partially cut-away view of FIG. 7 after the button is pressed.
Figure 12:
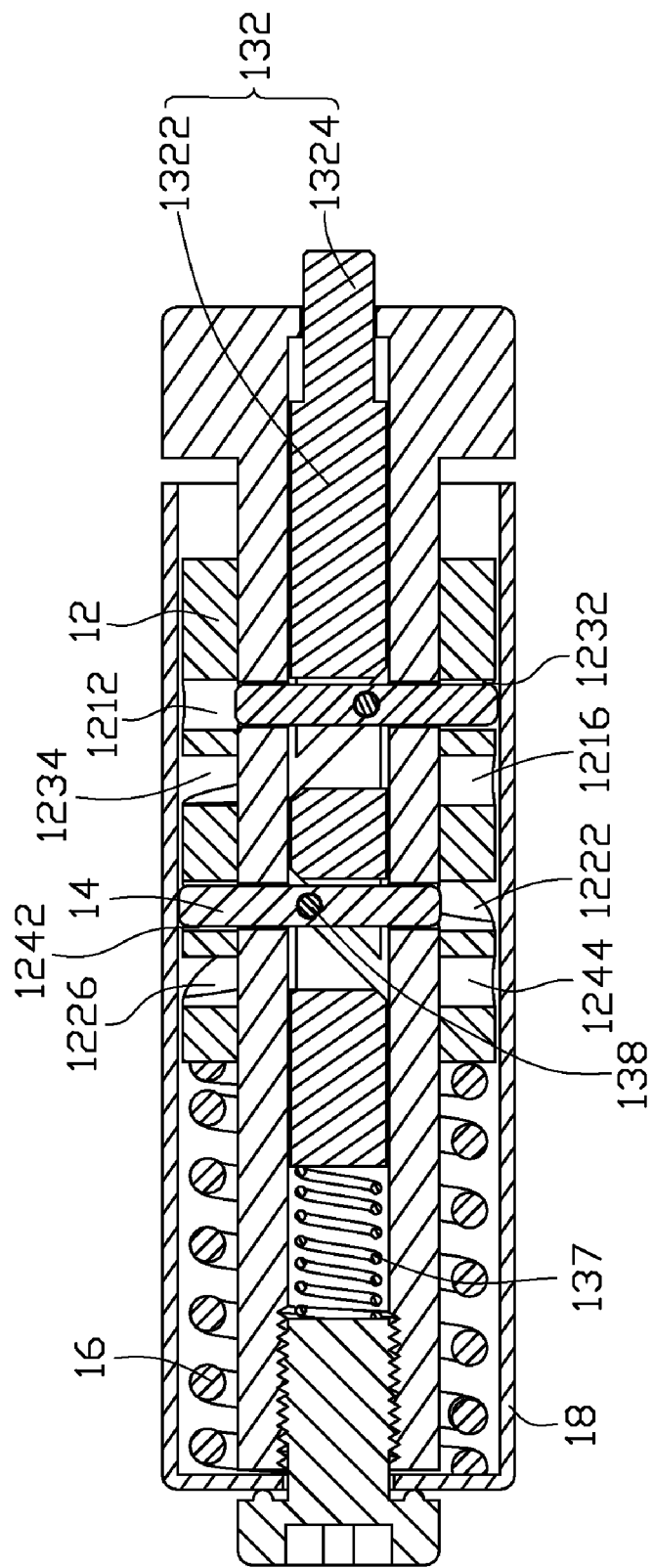
FIG. 12 is a cross-sectional view of FIG. 11 along XII-XII line.

Referring to FIGS. 11 and 12, under the role of the guiding pins 138, the fixing pins 14 respectively break away from the first manual slot 121, the second manual slot 122, and move to the first automatic slot 123, the second automatic slot 124. The housing 12 slides and rotates relative to the fixing pins 14 under the compression spring 16 so as to automatically open the cover section 102 of the mobile phone 100.

Figure 13:
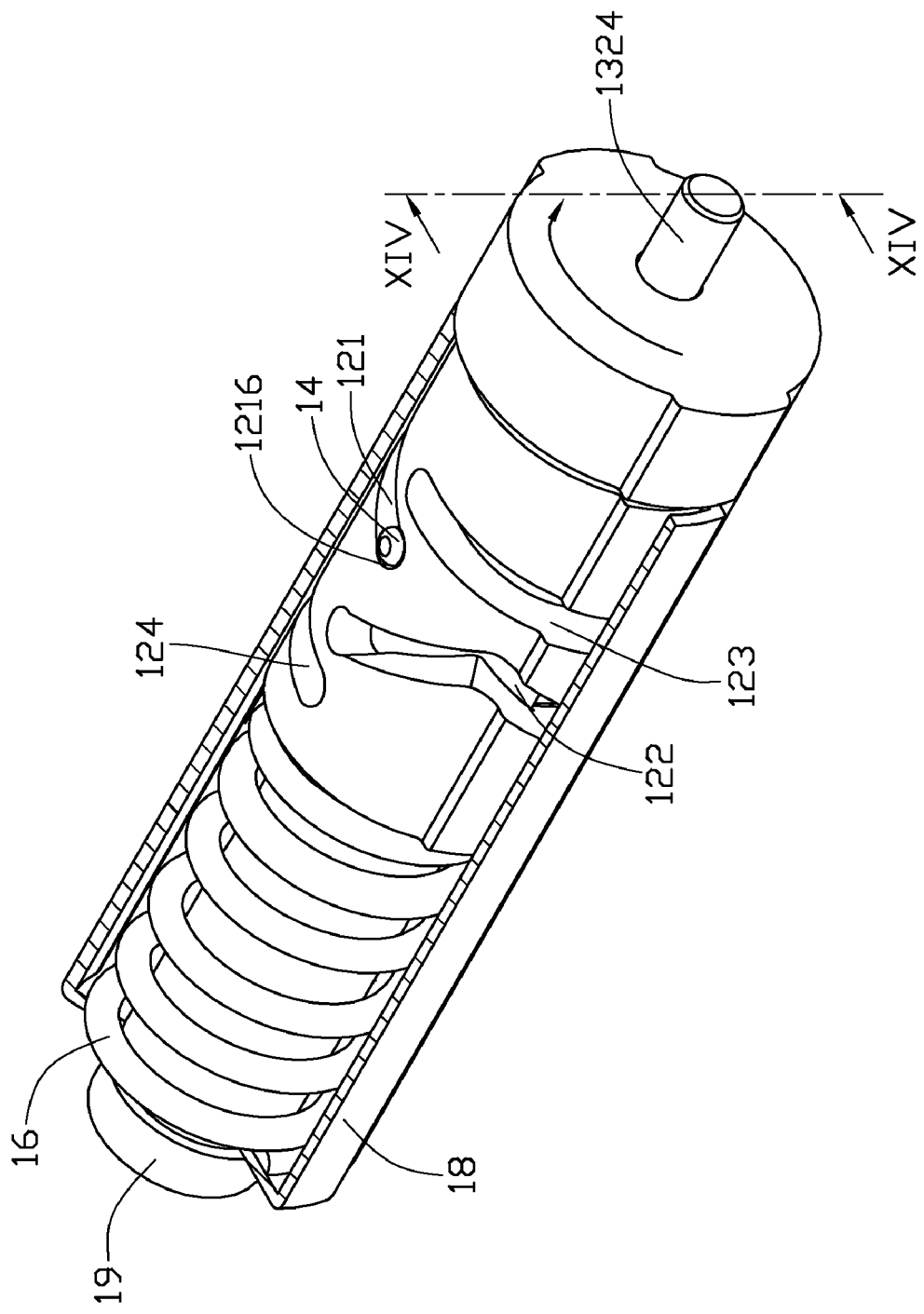
FIG. 13 is a partially cut-away view of FIG. 7 after the button is released.
Figure 14:
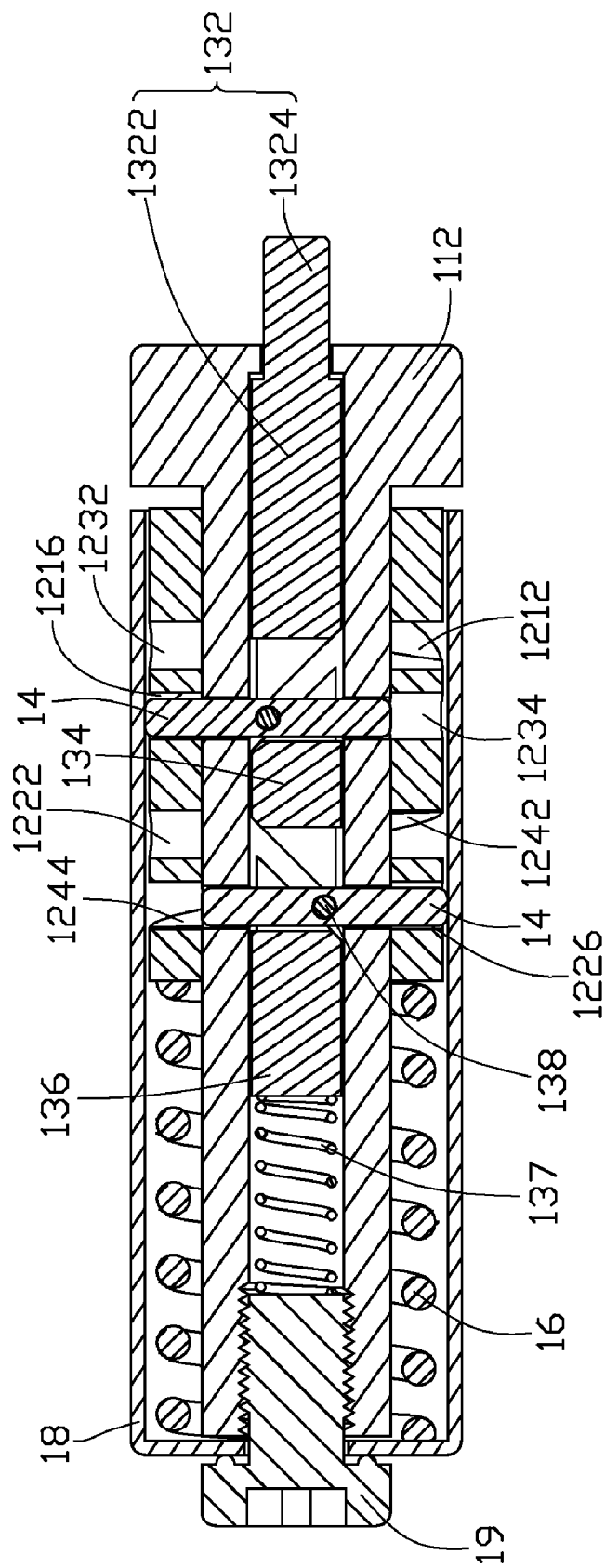
FIG. 14 is a cross-sectional view of FIG. 13 along XIV-XIV line.

Referring to FIGS. 13 and 14, after the push element 132 is released, the driven spring 137 pushes the return element 136 so that the push element 132 returns to an original position. The return element 136 and the follower element 134 reversely push the guiding pins 138. The guiding pins 138 further bring the fixing pins 14 to move to the first, second manual slot 121, 122. The housing 12 stops rotating when the cover section 110 of the mobile phone 100 is completely opened.

When the cover section 102 of the mobile phone 100 is being closed, the cover section 102 by hand is rotated relative to the body section 104. The sleeve 18 further brings the housing 12 to rotate. When the housing 12 rotates, the first and second manual slot 121 and 122 move and rotate relative to the fixing pins 14. When the fixing pins 14 slide to pass over the first, second convex portion 1214 and 1224 of the housing 12, the compression spring 16 accumulates elastic potential energy. When outside force is stopped to exert on the cover section 102, the housing 12 automatically slides relative to the fixing pins 14. Accordingly, the cover section 102 is closed relative to the body section 104 of the mobile phone 100. The hinge assembly 200 may be opened manually. The principles of the manual opening process are basically the same as the manual closing process.

Figure 15:
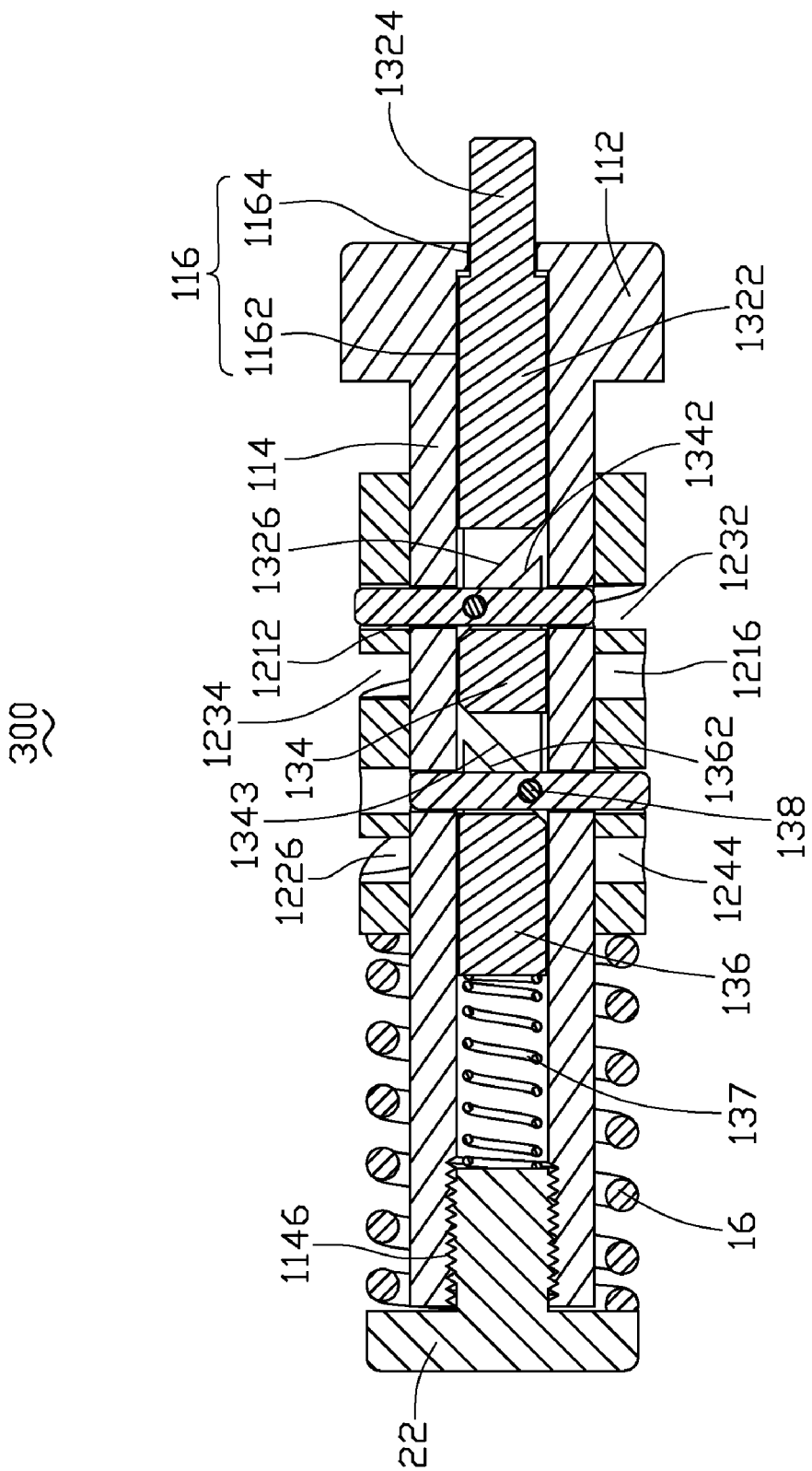
FIG. 15 is a cross-sectional view of a second embodiment of the hinge assembly.

In a second embodiment, referring to FIG. 15, a hinge assembly 300 is mostly the same with the hinge assembly 200 of the first embodiment. The difference is that the hinge assembly 300 omits the sleeve 18. The compression spring 16 will directly resist the screw 22. The projections 126 of the housing 12 will engages with the cover section of the mobile phone. The embodiment of the invention may reduce the number of the elements, which would help satisfy the requirement of low costs. Understandably, the screw 22 may be omitted, and the compression spring 16 and the driven spring 137 may directly resist the cover section of the mobile phone.

Figure 16:
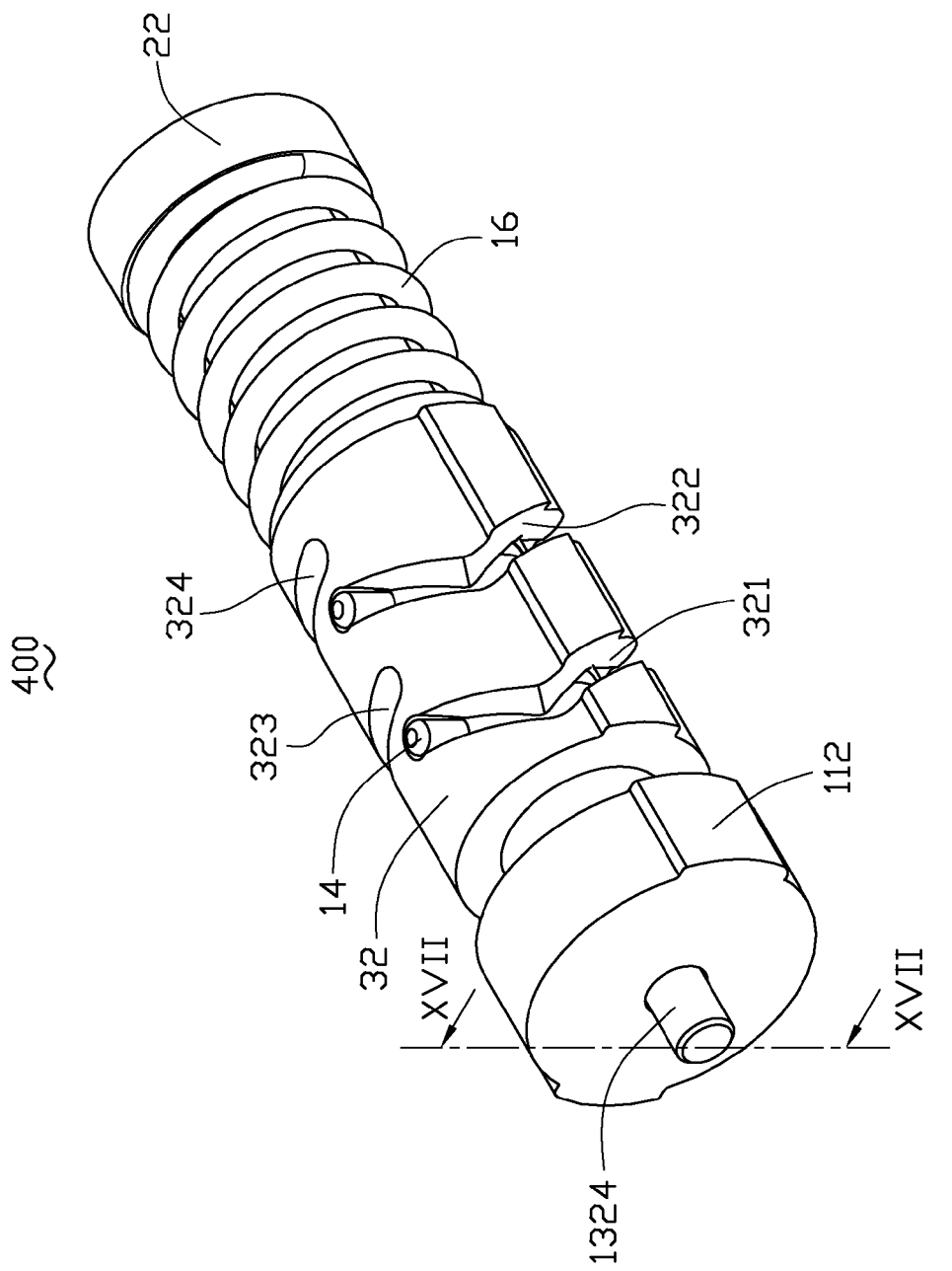
FIG. 16 is an assembled, isometric view of a third embodiment of the hinge assembly.
Figure 17:
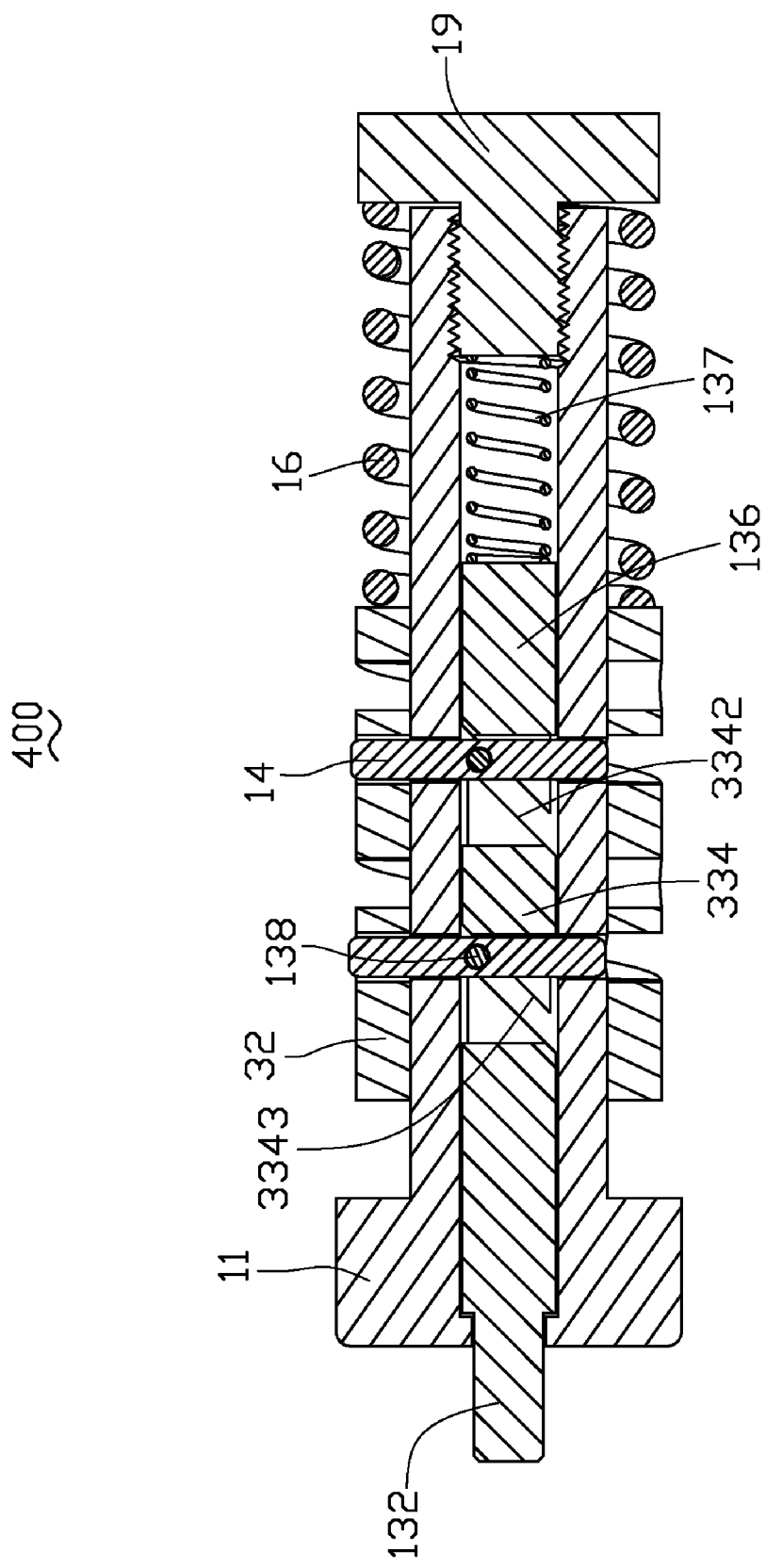
FIG. 17 is a cross-sectional view of FIG. 16.

In a third embodiment, referring to FIGS. 16 and 17, a hinge assembly 400 is mostly the same with the hinge assembly 300 of the second embodiment. The difference relies on a housing 32 and a follower element 334 of the hinge assembly 400. The housing 32 includes a first manual slot 321, a second manual slot 322, a first automatic slot 323 and a second automatic slot 324. The first manual slot 321 and the second manual slot 322 are parallel with each other, and are disposed at the same side of a peripheral wall of the housing 32. The first automatic slot 323 and the second automatic slot 324 are parallel with each other, and are disposed at the same side of a peripheral wall of the housing 32. The follower element 334 includes a second wedge end 3342 and a third wedge end 3343. The second wedge end 1342 is parallel with the third wedge end 3343.

Figure 18:
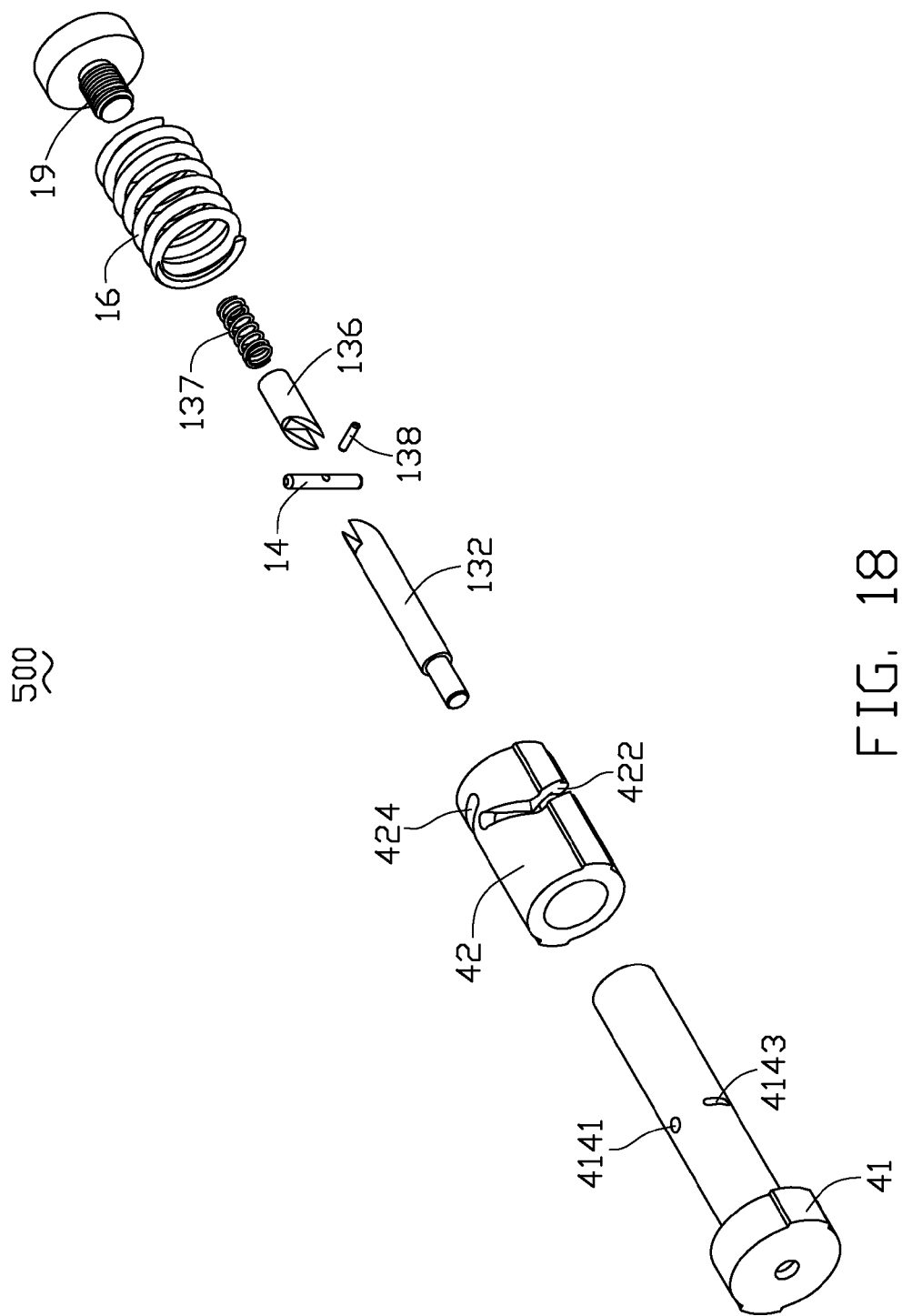
FIG. 18 is an exploded, isometric view of a fourth embodiment of the hinge assembly.
Figure 19:
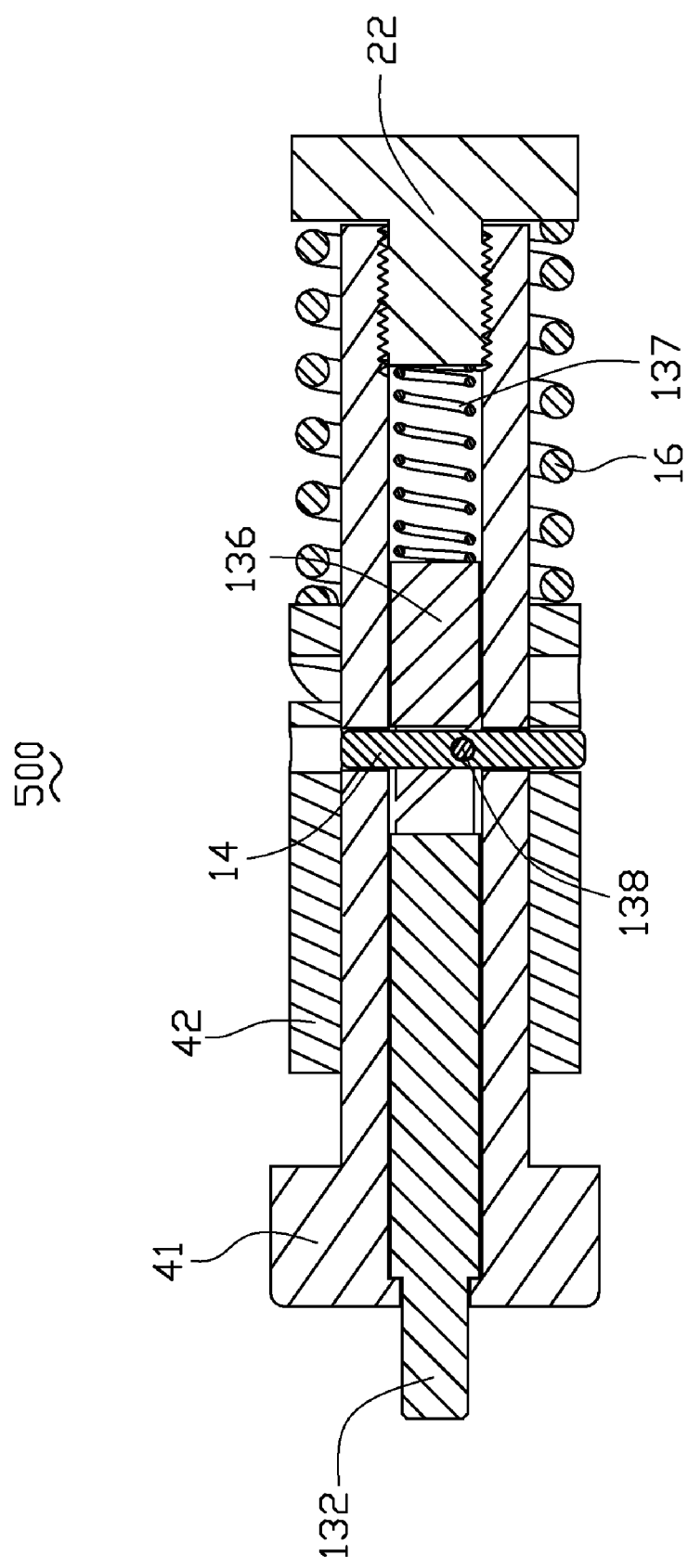
FIG. 19 is a cross-sectional view of the hinge of FIG. 18 after the hinge has been assembled.
Figure 20:
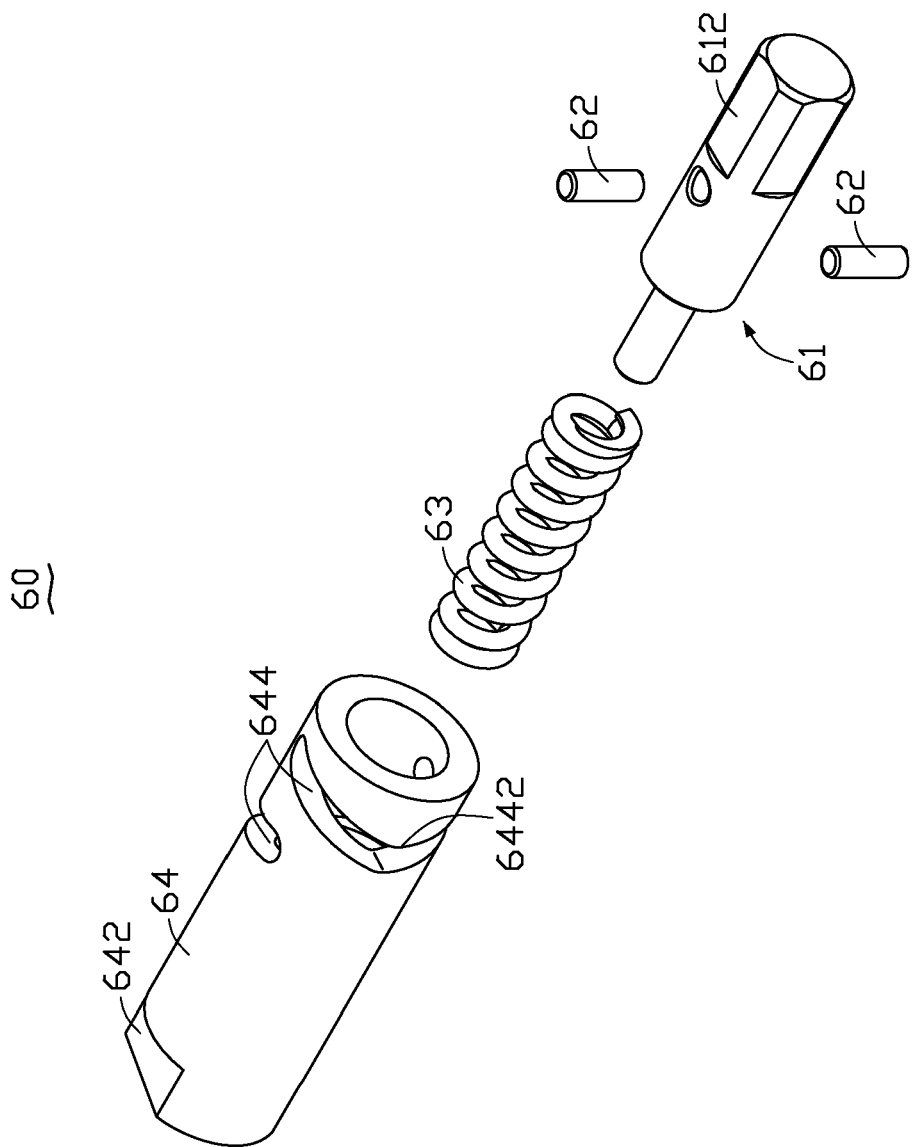
FIG. 20 is an exploded, isometric view of a conventional hinge assembly.
Figure 21:
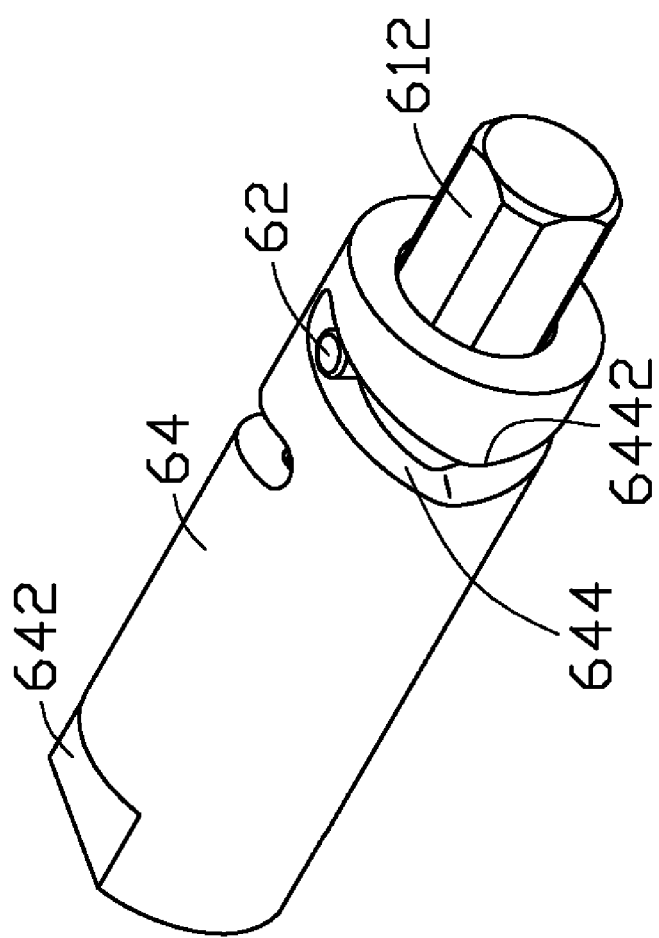
FIG. 21 is an assembled view of FIG. 20.

In a fourth embodiment, referring to FIGS. 18 and 19, a hinge assembly 500 is mostly the same with the hinge assembly 400 of the third embodiment. The difference is that the housing 42 of the hinge assembly 500 only defines a manual slot 422 and an automatic slot 424. In addition, the follower element is deleted. Accordingly, the guiding pin 138 is resisted between the push element 132 and the return element 136.

In an alternative embodiment, the compression spring 16 and the driven spring 137 may be replaced by other elastic elements such as an elastic sponge.

Understandably, the shape of the push element 132, the follower element 134 and the return element 136 is not limited to be cylindrical as long as the shape of the above elements can be received in the passage 116.

As described above, the present invention provides a hinge assembly 200 for use with various portable devices, beyond the mobile phone illustrated, and/or with other devices needing a hinge assembly that selectably facilitates the achievement of fully open and fully closed positions.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A hinge assembly, comprising:
   a housing having a circumferential wall defining a manual slot and an automatic slot;
   a shaft defining a pin hole, the shaft engaged in the housing;
   a fixing pin, the fixing pin passing through the pin hole of the shaft, and one end of the fixing pin received in the manual slot to limit the fixing pin movement;
   a transposition mechanism for removing the end of the fixing pin from the manual slot forcing the other end of the fixing pin in the automatic slot; and
   a first spring providing an elastic force causing the housing to automatically move relative to the shaft when the fixing pin is in the automatic slot.

2. The hinge assembly as claimed in claim 1, wherein the transposition mechanism includes a control module and a guiding pin, the guiding pin is fixed with the fixing pin, the control module pushes the guiding pin to move so that the guiding pin brings the fixing pin to move from the manual slot to the automatic slot.

3. The hinge assembly as claimed in claim 2, wherein the shaft defines a sliding slot, the fixing pin defines a receiving hole, the guiding pin passes through the sliding slot of the shaft, and is fixed in the receiving hole.

4. The hinge assembly as claimed in claim 3, wherein the transposition mechanism further comprises a second spring, and the second spring pushes the control mechanism to move from a first position to a second position.

5. The hinge assembly as claimed in claim 3, wherein the shaft is hollow, the transposition device is received in the shaft, the control mechanism includes a push element and a return element, and the guiding pin is resisted between the push element and the return element.

6. The hinge assembly as claimed in claim 5, wherein the push element has a first wedge end, the return element has a second wedge end, the first wedge end and the second wedge end resist the fixing pin, the first wedge end defines a first groove, the second wedge end defines a second groove, and the first groove and the second groove are configured for receiving the fixing pin.

7. The hinge assembly as claimed in claim 1, wherein each end of the manual slot is aligned with a corresponding end of the automatic slot along a circumferential direction of the housing.

8. The hinge assembly as claim in claim 7, wherein one end of the manual slot is angled 180 degrees with the other end thereof along the circumferential direction of the housing, and one end of the automatic slot is angled 180 degrees with the other end thereof along the circumferential direction of the housing.

9. The hinge assembly as claimed in claim 1, further comprising another fixing pin, the housing further defines another manual slot and another automatic slot, the shaft further defines another pin hole, the two fixing pins are respectively received in a corresponding pin hole and a corresponding manual slot.

10. The hinge assembly as claimed in claim 9, wherein the transposition mechanism includes a control module and two guiding pins, each guiding pin is fixed with a corresponding fixing pin, the control module pushes the guiding pins to move so that the guiding pins bring the fixing pins to move from the manual slot to the automatic slot.

11. The hinge assembly as claimed in claim 10, wherein the shaft defines two sliding slot, each fixing pin defines a receiving hole, each guiding pin passes through the sliding slot of the shaft, and is fixed in a corresponding receiving hole.

12. The hinge assembly as claimed in claim 11, wherein the control module includes a push element, a follower element, and a return element, one of the guiding pins is resisted between the push element and the follower element, and the other one of the guiding pins is resisted between the follower element and the return element.

13. The hinge assembly as claimed in claim 12, wherein the push element has a first wedge end, the follower element includes a second wedge end and a third wedge end, the return element has a fourth wedge end, the first wedge end defines a first groove, the second wedge end defines a second groove, the third wedge end defines a third groove, the fourth wedge end defines a fourth end, the first groove and the second groove are configured for receiving one fixing pin, the third groove and the fourth groove are configured for receiving the other fixing pin.

14. A hinge assembly of a foldable electronic device comprising a main body and a flip cover, the hinge assembly comprising:
    a housing defining a manual slot and an automatic slot, the housing being configured so as to be fixed relative to one of the main body and the flip cover;
    a shaft defining a passage and two pin holes, the two pin holes running through the passage along a diameter direction thereof, the shaft received in the housing, the shaft configured so as to be fixed relative to the other of the main body and the flip cover;
    a fixing pin, one end of the fixing pin received in the manual slot and one pin hole of the shaft, the other end of the fixing pin received in the other pin hole and being facing the automatic slot;
    a transposition mechanism configured for removing the fixing pin from the manual slot to the automatic slot; and
    a first spring providing an elastic force causing the housing to move relative to the shaft when the transposition mechanism pushes the fixing pin from the manual slot to the automatic slot so that the fixing pin breaks away from of the manual slot.

15. The hinge assembly as claimed in claim 14, wherein the transposition mechanism includes a guiding pin, a push element and a return element, the guiding pin is fixed with the fixing pin, and the guiding pin is resisted between the push element and the return element.

16. The hinge assembly as claimed in claim 15, wherein the shaft defines a sliding slot, the fixing pin defines a receiving hole, the guiding pin passes through the sliding slot of the shaft, and is fixed in the receiving hole.

17. The hinge assembly as claimed in claim 15, wherein the push element has a first wedge end, the return element has a second wedge end, the first wedge end defines a first groove, the second wedge end defines a second groove, and the first groove and the second groove are configured for receiving the fixing pin.

18. A foldable electronic device having a main body and a flip cover hinged together by a hinge assembly, the hinge assembly comprising:
    a housing, the housing being fixed with respect to one of the flip cover and the main body;
    a shaft, the shaft being fixed with respect to the other of the flip cover and the main body, one of the housing and the shaft defining a pin hole, the other of the housing and the shaft defining a manual slot and an automatic slot;
    a fixing pin being inserted into the pin hole and one of the manual slot and the automatic slot;
    a control module for removing the fixing pin from the manual slot and inserting the fixing pin in the automatic slot;
    a first spring providing an elastic force to make the fixing pin rotate when the fixing pin is received in the automatic slot; and
    a second spring providing an elastic force to make the control module move from a first position to a second position;
    wherein the control module is pressable to axially move relative to the shaft so that the fixing pin moves from the manual slot to the automatic slot so that the housing is rotatable relative to the shaft under the elastic force of the first spring.

19. The hinge assembly as claimed in claim 18, further comprising a guiding pin, the guiding pin is fixed with the fixing pin, the control module pushes the guiding pin to move so that the guiding pin bring the fixing pin to move from the manual slot to the automatic slot.

20. The hinge assembly as claimed in claim 19, wherein the shaft defines a sliding slot, the fixing pin defines a receiving hole, the guiding pin passes through the sliding slot of the shaft, and is fixed in the receiving hole.

* * * * *